Dec. 29, 1959 H. ODEN ET AL 2,919,310

PULSE TRANSMITTER SYSTEM

Filed March 27, 1956 4 Sheets-Sheet 1

INVENTORS
H. ODEN
V. EPINATJEFF
K. SASS
H. HEHR

BY Robert Harding Jr.
ATTORNEY

Dec. 29, 1959 H. ODEN ET AL 2,919,310

PULSE TRANSMITTER SYSTEM

Filed March 27, 1956 4 Sheets-Sheet 2

INVENTORS
H. ODEN
V. EPINATJEFF
K. SASS
H. HEHR

BY Robert Harding Jr.
ATTORNEY

INVENTORS
H. ODEN
V. EPINATJEFF
K. SASS
H. HEHR

BY Robert Harding Jr.
ATTORNEY

INVENTORS
H. ODEN
V. EPINATJEFF
K. SASS
H. HEHR
BY Robert Harding Jr.
ATTORNEY

United States Patent Office
2,919,310
Patented Dec. 29, 1959

2,919,310

PULSE TRANSMITTER SYSTEM

Hoeckley Oden, Stuttgart-Stammheim, Valentin Epinatjeff, Stuttgart-Zuffenhausen, Karl Sass, Stuttgart-Stammheim, and Hermann Hehr, Stuttgart, Germany, assignors to International Standard Electric Corporation, New York, N.Y., a corporation of Delaware Application March 27, 1956, Serial No. 574,204

Claims priority, application Germany March 31, 1955

10 Claims. (Cl. 179—90)

Figure 1A:
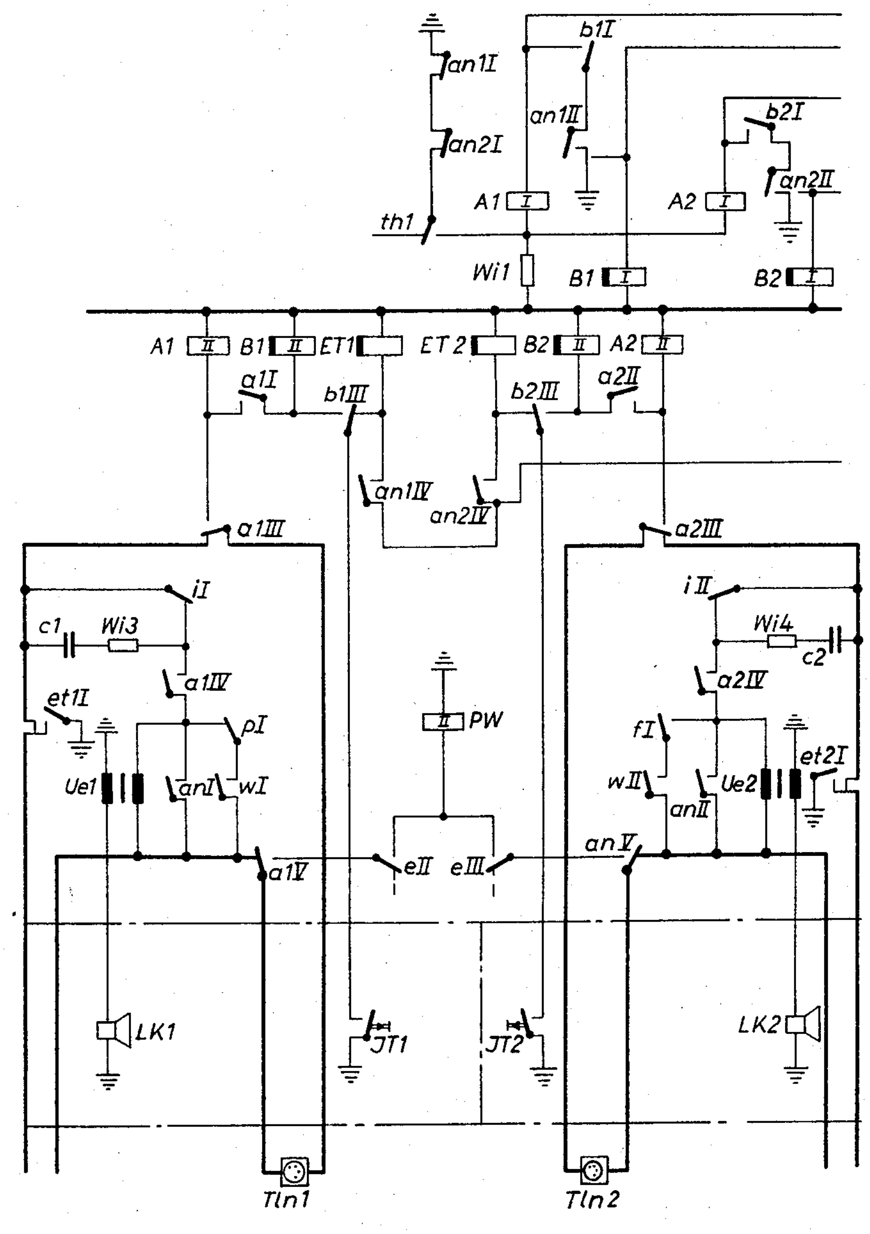

This invention relates to automatic telephone systems and more particularly to an improved circuit arrangement for interconnecting a subscriber's push button device to the switching equipment at the exchange to enable transmission of series of coded digit impulses without separately dialing each digit.

It is a known practice in telephone systems to transmit certain call numbers, belonging to frequently used connections, by means of an additional piece of pulse producing equipment; such transmission being performed automatically. One well known embodiment of such a bulk-number selector provides switching wheels or cam discs, respectively, which the calling subscriber may optionally cut into the calling circuit, for the purpose of sending of a multi-digit call number, by the actuation of sliders, push-buttons, or the like. It is also known to implement the emission of certain call numbers by means of selectors which are started by manually operated switching means such as push-buttons. In a known arrangement, a scanning switch determines the number of pulses and incorporates one switching arm for each call number and slides across a contact bank wired according to the call number. In this case, the bank contacts of the scanning switch are sub-divided corresponding to the number of digits in the call numbers, the arrangement being so devised that a relay terminating the pulse emission becomes energized via these marked contacts of the contact groups which correspond to the particular digits of the call number.

The invention relates to an arrangement of the last-mentioned kind. It aims at decreasing the amount of required apparatus and simplifying the operation of the apparatus. The operation of applicants' invention is such that actuation of a destination button prior to the lifting of the handset causes the automatic emission of the impulse trains after release of the destination button and after reception by the calling subscriber of a proceed-to-dial signal. Actuation of such a destination button will then engage an outgoing connecting facility. The outgoing talking leads from the subscriber's set disconnected, and an impulse contact of an impulse relay is looped into the subscriber line, along with a transformer for the purpose of connecting a receiver to the line. After seizure of an outgoing connecting facility the subscriber is thereby enabled to receive the proceed-to-dial signal and to initiate, by release of the destination button, the emission of the predetermined call number, or of portions of the same. According to a further feature of the invention, the pulse switching means in response to the emission of the selecting impulses controls a control and counting device consisting essentially of two magnetic impulse counters. With this arrangement, one of the two magnetic impulse counters receives the number of pulses within each pulse sequence, while the other magnetic counter accepts the serial number of the pulse series. The call number to be sent is defined by appropriate jumpering between these two magnetic counters. Upon the release of each normal pulse series, test means are actuated via these magnetic counters, and they suppress the emission of further impulses while simultaneously cutting in the switching means which for the duration of one selector hunting period will delay the transmission of the next pulse series. These switching means which control the delay, reset the magnetic counter to zero position for reception of the number of pulses; but they advance by one step the magnetic counter which receives the serial number of the pulse series. By employing a current responsive device in the test circuit via these magnetic counters it is possible to discriminate between the normal and the last pulse series. Consequently, upon the emission of the last pulse series there will be actuated a switching means which indicates the end of the pulse series, and this switching means in turn connects a polarity-reversal relay into the circuit serving the purpose of actuating the ringer of the calling subscriber for indication of termination of the selecting process. After aural reception of the proceed-to-dial signal by the calling subscriber, he can effect through-switching to the selected connection by lifting the handset. According to a further feature of the invention the subscriber may release the connection by depressing his ground button when he hears the busy signal. At any time, moreover, he is in a position to suppress the emission of pulse trains by actuation of his ground button which is provided for other purposes, and he may thus clear the impulse transmitter. According to a further feature of the invention an impulse emitter may be operated from two branch sets, particularly in private branch systems, in which case only a push button panel is associated with each branch set which controls the common relay facility of the pulse transmitter. There is then allotted to each one of these subscribers a signalling lamp, which, upon engagement of one of these two subscribers, will continuously light, but will light intermittently, in the rhythm of the impulses, on emission of the pulse series.

The above-mentioned and other features and objects of this invention and the manner of attaining them will become more apparent and the invention itself will be best understood, by reference to the following description of an embodiment of the invention taken in conjunction with the accompanying drawings, wherein:

Figs. 1*a* . . . 1*d* represent a schematic diagram of a pulse transmitting circuit according to the invention; the several figures being laid side by side in the order indicated thereon.

The circuit as shown may be used for two branch substations such as is found, for instance in private branch exchange systems. The circuit may also be used in a main exchange plant. The switching processes described hereinafter with reference to an internal connection of a private branch exchange system will be the same as involved in the establishment of a connection from a main set. However, the subscriber of a main set, when depressing the destination key, engages the central office and hence receives the proceed-to-dial signal from this exchange, whereas in the private branch exchange system during establishment of an internal connection the act of depressing the key will engage an internal connecting set of the private branch exchange system, and the subscriber therefore receives the proceed-to-dial signal from the private branch exchange system.

*Establishment of an internal connection through the pulse-transmitter*

Assume that a calling subscriber TL*n*1 wants to establish connection with a subscriber having the call number 51869. The calling subscribed first depresses one of the destination buttons T1 . . . T30, each of which is adapted to transmit pulse trains corresponding to different call numbers—without lifting the handset. A circuit is completed for relays AN1 and H1 via: +, contacts *an*III, *b*2V, *a*2VI, relay AN1, button T1, winding I of relay H1, contact *u*I, resistance *Wi*5. Relays AN1 and H1 respond. Contact *an*III (Fig. 1*b*) closes a circuit for winding I of relay B1 over an obvious path and contact *b*1I completes a circuit for relay A1(I) via closed contact *an*1II. Contact *a*1IV closes, via the transformer *Ue*1, a metallic loop via line *a, b,* to the internal connecting facilities, whereas the contacts *a*1III *and* *a*1V disconnect the loop of the calling subscriber station from the line *a, b*. By the closing of the metallic loop, a line finder (not shown) proceeds to locate the calling line *a, b*. Dial tone is received over the line *a, b* from the P.B.X system via the transformer *Ue*1 to the loud speaker LK1 of the subscriber. When the aural signal has sounded, the subscriber releases the destination button T1. Automatic emission of the call number of the wanted subscriber is thereby initiated. The circuit for the relay AN1 is interrupted upon the release of button T1, so that relay AN (Fig. 1*b*) is energized via: +, closed contacts *a*1I, *b*1II, back contacts *an*1III, *e*I, relay AN, —. A path for the energization of relay I (Fig. 1*c*) is completed via: +, front contacts *an*IV, transfer contacts *f*VI, *u*IV, *p*III, *i*IV, resistance *Wi*12, winding II of relay I, —, which thereupon generates regularly recurring impulses. Transfer contact *i*IV interrupts the energizing circuit for its associated winding III and relay I will fall. When relay I falls, its contact *i*IV will again complete an energizing circuit for said winding. With each impulse generated by the relay I, the magnetic counter IM is energized via: +, closed contacts *an*IV, transfer contacts *f*VI, closed contact *i*V, impulse winding I of counter IM, resistance WI11, and the individual contacts of the counter are thereby consecutively operated. The operation of such a magnetic counter is well known and corresponds to that of a selector switch. For a more precise explanation of a magnetic impulse counter, U.S. Patent No. 2,441,001 (reissued March 15, 1949, Re. No. 23,089) may be consulted. The two magnetic counters IM and SM contained in the sample embodiment have been represented, for the sake of simplicity, as rotary selectors in Fig. 1*d* with the arms *im* and *sm*, respectively, the bank of contacts corresponding to successive contacts in the counters IM and SM.

Via the contact *i*I, (Fig. 1*a*) the impulses are transmitted over line *a, b* and serve to actuate the central switching apparatus (not shown). It has been assumed that the number 51869 is to be transmitted. After the 5th impulse created by relay I, the relay P (Fig. 1*c*) is caused to respond via +, position 0 of arm *sm* of magnetic counter SM, closed contact *h*1II, resistance W*ie*, position 5 of the magnetic counter IM, arm *im*, back contacts *i*VI, *f*V, *w*III, winding I of relay E, winding I of relay P, —. The operating characteristics of relay E are such that the series resistance of resistor W*ia* prevents sufficient current to flow in the circuit to operate relay E. Transfer contact *p*III opens the circuit for winding II of relay I. Contact *p*V closes a circuit for winding I of relay F. The magnetic counter SM is energized via +, closed contacts *an*IV, *f*VI, *p*VI, impulse winding I of counter SM, resistance W*i*11, —, and it proceeds to the position 1. By the response of relay F, its contact *f*V interrupts the circuit for relay P which drops after a predetermined delay owing to the short-circuiting of its winding II by closed contact *p*I. During the delay period of relay P, the reset winding II of the counter IM is energized via: +, closed contacts *f*IV, *p*II, winding II of counter IM, resistance W*i*7, —, so that counter IM is switched back to the rest position. After the release of relay P, the energizing circuit of relay F is opened. Relay F drops with a drop delay of one inter-digital time period, since after drop of this relay the impulse relay I is re-energized over contact *f*VI, and the emission of the second pulse series, in the chosen example the number 1, is started. After the emission of one impulse, the magnetic counter IM (arm *im*) is advanced to the position 1, thus causing relay P to again respond via: +, position 1 of the magnetic counter SM (arm *sm*), closed contact *h*1III, resistance W*ia*, position 1 of the arm *im*, closed contacts *i*VI, *fv*, *w*III, winding I of relay E, winding I of relay P, —.

The circuit of relay I is interrupted by the contact *p*III. As already described, the magnetic counter IM has advanced from the zero position, and the counting magnet SM has advanced by one step. The transmission of the further numbers occurs in the same manner. After completion of each pulse series, the magnetic counter SM advances one step, so that upon the transmission of the last digit (in the chosen example the digit 9), SM is in position 4. After transmission of the last impulse corresponding to digit 9, the already described circuit for the energization of windings I of both relays E and P is again established, although without the connection of a series resistor W*i* associated with position 9 of *im*—with the result that sufficient current flows through the series circuit which includes relay P, and relay E responds, the latter indicating the end of the dialling process. Via its own contact *e*II (Fig. 1*b*) the relay E holds up by means of its second winding, after relay F has been energized and contact *f*V interrupted the circuit through which the relays P and E are energized. Contact *e*I interrupts the circuit for the relay AN which de-energizes and, by means of its back contact *an*III, energizes the reset winding of the magnetic counters SM and IM via: +, *an*III, *b*1V, reset winding II of counter SM (Fig. 1*c*), reset winding II of counter IM, resistance W*i*7, —, so that both magnetic counters are brought to their zero position. Relay PW is energized via: +, make-make contact *f*IV, make contact *e*IV, break contact *pw*I, winding I of relay PW, resistance W*i*8, —, the pole reversal relay PW is energized; via winding II of relay PW (Fig. 1*a*) and during the drop time of relay F it causes the ringer of the calling subscriber to operate, signalling the end-of-dialling. With the drop of relay AN contact *an*I has coincidentally eliminated the short-circuit of the primary winding of transformer *Ue*1 existing while dialling; hence, the subscriber is now enabled to hear the ringing or busy signal in his loud speaker LK1. If the busy signal is heard, then the calling subscriber depresses the ground key JT1 customarily provided for inquiry. A circuit is completed thereby for the deenergization of relay A1 via: +, key contacts JT1, transfer contacts *b*1III, make contact *a*1I, winding II of relay A1, —. Since both windings I and II of relay A1 are wound in opposition, relay A1 drops. Open contact *a*1IV now breaks the metallic loop and the connection that had been established is cleared. In addition back contact *a*1V reconnects the subset T1*n*1 to the lines *a, b*. The impulse transmitter is also released. On the other hand, if the calling subscriber hears the idle signal, he lifts his handset, establishing thereby the following circuit: +, winding II of relay PW, transfer contacts *e*II, *a*1V, subscriber set T1*n*1, transfer contact *a*1III, winding II of relay A1, —.

Relay A1 is caused to drop upon the movement of transfer contact *a*1III since it will be remembered that its winding II is wound in opposition to its winding I, and the impulse transmitter is released. The connection is now held by the loop that runs via the subscriber set.

*Establishment of an exchange connection*

Figure 1B:
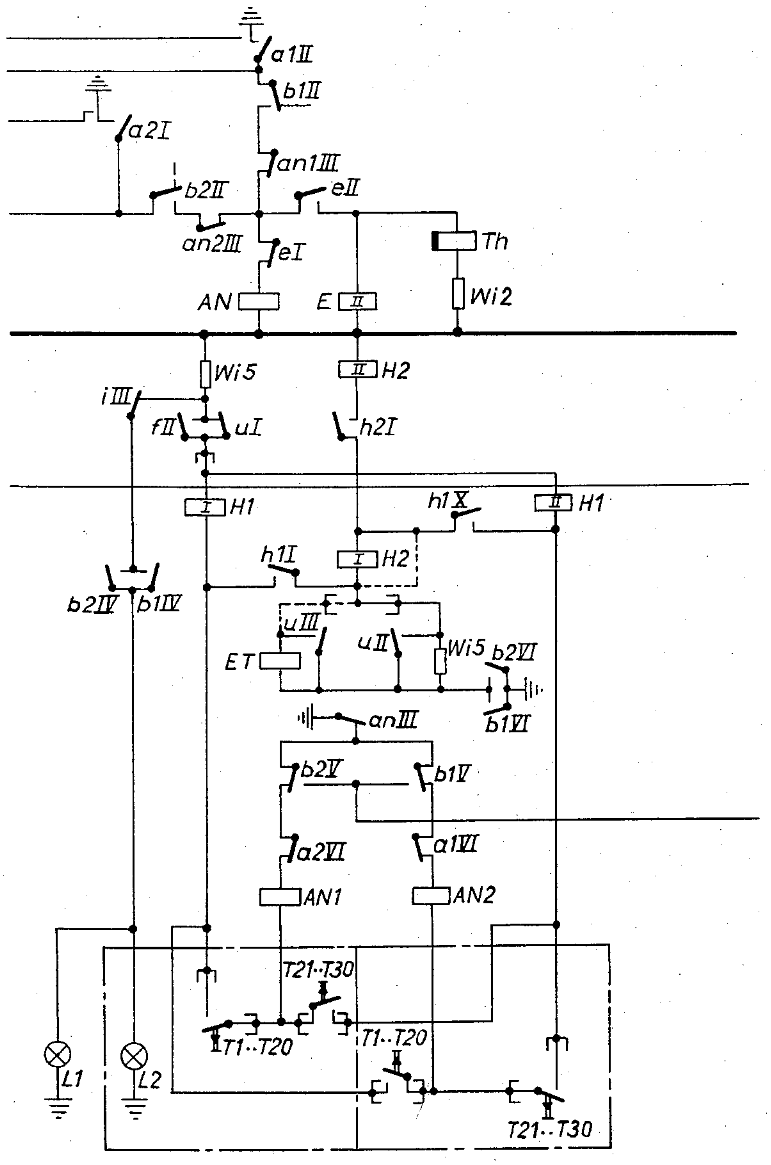
Figure 1C:
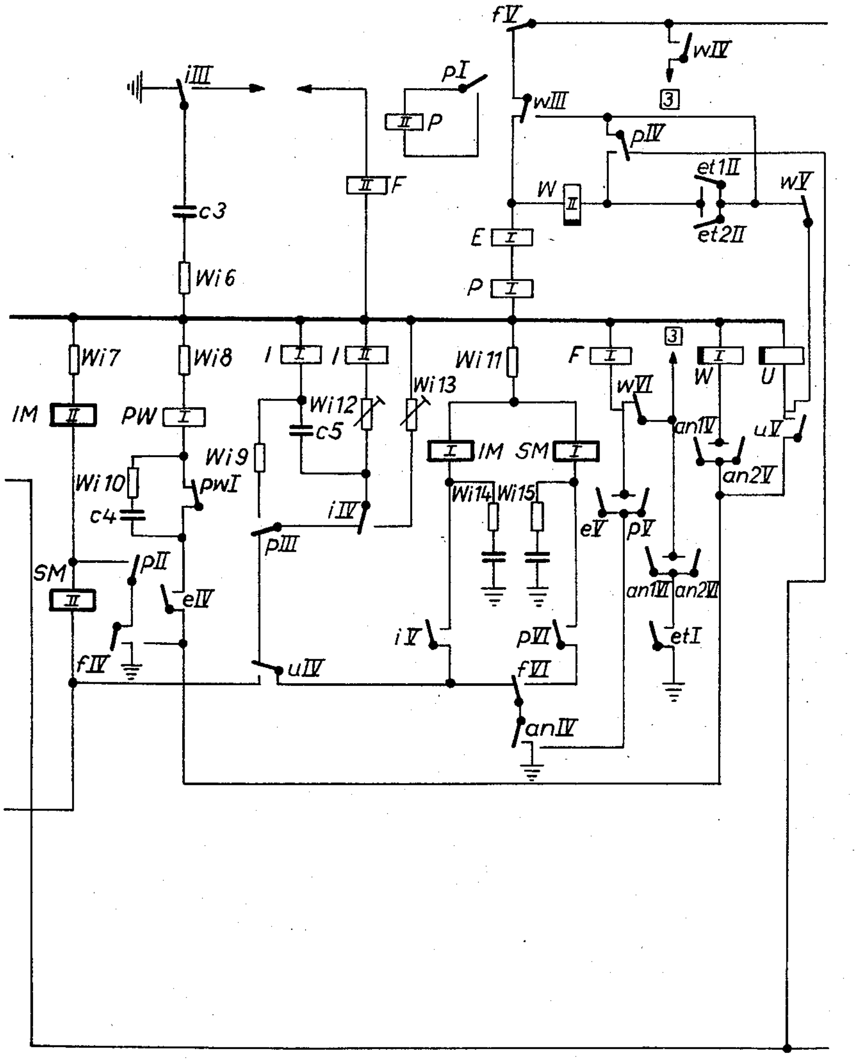
Figure 1D:
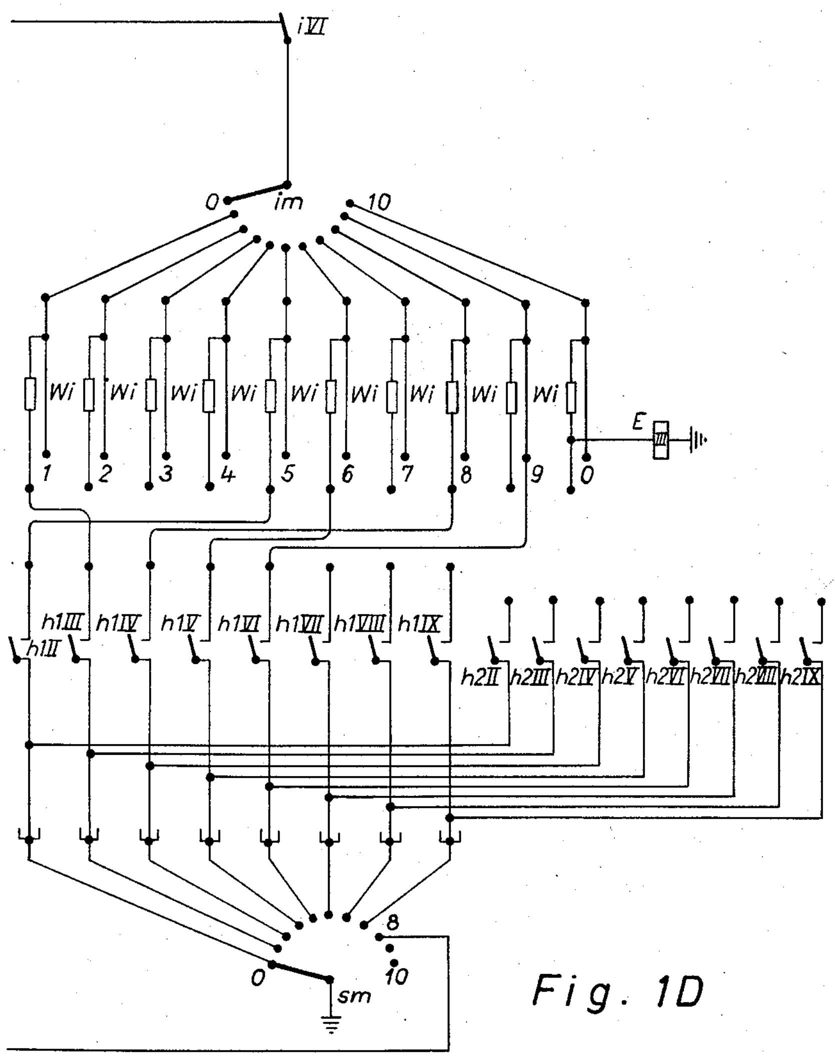

If the impulse transmitter is used in a P.B.X system where the trunking unit is engaged by code selection, then the jumpering between the magnetic counters is so arranged that the exchange digit ranks as the first figure. The connection is established in the manner already described. If the impulse transmitter is used in a P.B.X system where the trunking unit is engaged by depressing the ground button, then the connection is so made as indicated by the dotted line in Fig. 1*b*. Assuming now, that a P.B.X subscriber wants a trunk connection with the number 51869. Again, without lifting his handset, he depresses the destination button corresponding to the wanted number, e.g. T1 (Fig. 1*b*). As already described, the relays AN1 and A1 will respond. Winding I of relay B1 is energized via make-make contact *an*1II. Relay ET is thereupon enegrized via: +, make contact *b*1VI, winding of relay ET, make contact *h*1X, winding II of relay H1, break contact *u*1, resistance W*i*5, —. Contact *et*I (Fig. 1*c*) completes a circuit for relay F via: +, make contacts *et*I, *an*1VI, break-break contact *w*VI winding I of relay F. A circuit is completed for relay W via: +, make-make contact *f*IV, front contact *an*1V, winding I of relay W, —.

The energizing circuit of relay F is opened by break-break contact *w*VI.

After relay F drops, relay ET1 (Fig. 1*a*) responds via: +, make contacts *et*I, *an*1VI, *w*IV (Fig. 1*c*) break contact *f*V, transfer contacts *w*III, *p*IV, make contact *an*1IV (Fig. 1*a*) winding of relay ET1, —.

Relay ET1 by its make-before-break contact *et*1I, applies ground to the outgoing *a* lead for trunking. Contact *et*1II (Fig. 1*c*) completes an energizing circuit for relay P and a holding circuit for relay W via: +, front contacts *et*I, *an*1VI, *w*IV, break contact *f*V, transfer contact *w*III, front contact *et*1II, winding II of relay W, winding i of relay *e*, winding I of relay P, —.

Shifting of the contact *p*IV breaks the circuit of relay ET1, and open contact *et*1I removes ground from the *a* lead. After the setting of a trunk selector, the subscriber receives via his loudspeaker LK1 the dial tone from the public exchange whereupon he releases the destination button T1. The transmission of the wanted subscriber number is thereupon initiated in exactly the same manner as previously described during the establishment of an internal connection.

*Establishment of a connection to a subscriber with a call number exceeding 8 digits*

When transmitting a call number having more than eight digits, the connection shown as a dotted line in Fig. 1*b* is omitted, and the connection shown as a dashed line is added. Transmission of the first eight digits occurs in the manner already described. After the eighth digit has been transmitted, the counter IM is in the zero position, the counter SM having been switched to the position 8, by advancing it one step. A circuit is thereby completed for the operation of relay U via: +, magnetic counter arm *sm* in the position 8, transfer contact *p*IV, back contact *w*V, make-before-break contact *u*V, winding of relay U, —. Relay U is energized and holds up as long as relay F is excited, i.e. during the selector hunting period, its contact *u*V serving as a holding contact. Contact *u*III closes a circuit for relay H2 (Fig. 1*b*) via: +, front contacts *b*1VI, *u*III, winding I of relay H2, front contact *h*1X, winding II of relay H1, front contact *f*II, resistance W*i*5, —.

Relay H2 is energized and holds up via its holding contact *h*2I and its winding II. After termination of the hunting period, relay F drops and its now open contact *f*II breaks the circuit for relay H1. The jumpering of the first eight digits between the two magnetic counters is now opened by virtue of the dropping of relay H1, and via contacts *h*2II . . . *h*2IX of relay H2, the jumpering of second eight figures is cut in. After relay F has dropped, relay U will also drop. The circuit for the impulse relay I is thereby closed again. Emission of the second eight figures is started and proceeds in the same way as already described.

*Establishment of an inquiry connection*

If in an existing trunk conversation a subscriber wants to implement a call-back action, he may then—after initiation of the inquiry through pressing the ground button J1T—use one of his destination buttons T1 . . . T30 for the establishment of the inquiry circuit, provided that the subscriber is represented by one such destination button. He depresses the respective destination button, and the already described processes will be initiated.

*Interruption of the emission of impulse trains upon erratic function of the impulse transmitter or wrong selection of the subscriber*

As already described, a control and counting device, consisting of the two magnetic counters, the test relay P and the relay E, are controlled simultaneously with the transmission of the impulse trains and the actuation of the impulse relay I. Relay P thereby interrupts the emission of the prevalent pulse train in functional dependence on the jumpering between the two magnetic counters. If through any kind of disturbance the test circuit via these two magnetic counters is not completed, i.e. if the relay P is not excited, then the transmission of the pulse trains can not be interrupted, so that the magnetic counter is switched through to its final position. Via this position, the following circuit (Fig. 1*d*) is then established: +, winding III of relay E, resistance Wij, position 10 of the magnetic counter IM, break contacts *i*VI, *f*V, transfer contact *w*III, winding I of relay E, winding I of relay P, —. Relays P and E respond. Contact *p*III prevents the further excitation of the impulse relay IM. As has already been described, the relay E indicates the termination of pulse train emission, and it releases the impulse transmitter. However, if a subscriber has mistakenly depressed the wrong destination button, or if other reasons cause him to interrupt the emission of pulse trains, he then actuates as an error button the ground button JT1 which is provided for the initiation of the inquiry, and causes relay A1 to drop since both its windings are wound in opposition. The circuit for the energization of winding II of relay AI is completed via: +, button contacts JT1, transfer contact *b*1III, front contact *a*1I, winding II of relay A1, —. The transmission of pulse trains is interrupted and the pulse transmitter is released. With contact *a*1IV opened, the outgoing subscriber's loop is opened and the engaged connection is thereby cleared.

*Use of the impulse transmission in P.B.X systems for two branch positions*

Two branch sets having the same frequent necessity for connections, may be allocated to one impulse transmitter. Each subscriber is equipped with a push button plate with the associated relays for the control of the common relay facility. In the embodiment illustrated in the drawing, the relays allocated to the respective subscriber for the control of the common device are marked with the index 1 for the subscriber 1, and with the index 2 for the subscriber 2. Moreover, each subscriber is provided with an indicating lamp L1 or L2, respectively, which upon engagement of the common facility by one of the subscribers will light and flicker in the rhythm of the impulse trains during the emission of the pulses. The establishment of a connection is achieved in the manner already described.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An auxiliary circuit arrangement for a telecommunications subscriber station for signalling selected subscribers in an automatic telecommunications system wherein each subscriber station has access to central switching apparatus over individual lines, each subscriber station comprising a plurality of switch elements, each element corresponding to the call number of a different one of said selected subscribers, means for generating calling impulses, means under control of said switch elements for seizing said central switching apparatus upon actuation of any switch element and for initiating operation of said generating means, indicating means coupled to the subscriber line for indicating seizure of said central switching apparatus, counting means for counting calling impulses generated by said generating means, a plurality of sets of different connections for said counting means, to mark the termination of trains of impulses generated by said generating means corresponding to the digits of such call numbers, each set under control of a different one of said switch elements, and switch means for switching said generating means to the subscriber line, said switch means operable upon release of said actuated switch element.

2. An auxiliary circuit arrangement as claimed in claim 1, wherein said means for seizing said central switching apparatus comprises electromagnetic relay means having contacts across the subscriber line and capable of completing a metallic loop thereover.

3. An auxiliary circuit arrangement as claimed in claim 2, wherein said means for seizing said central switching apparatus further comprises an electromagnetic relay having a plurality of contact sets, given of said contact sets interconnecting predetermined connections of said counting means.

4. An auxiliary circuit arrangement as claimed in claim 1, wherein said counting means comprises a pair of electromagnetic impulse counters each having an attraction coil, a reset coil, and a plurality of separate armatures, each armature controlling a separate contact set, a first one of said impulse counters adapted to count the pulses of each digital train and the other of said counters adapted to count the number of said trains.

5. An auxiliary circuit as claimed in claim 4, wherein said first impulse counter further comprises a plurality of resistance elements each coupled to a different one of said connections for said counting means, each of said sets of different connections comprising a connection through a different one of said resistance elements with the exception of the connection representing the ultimate digit of the called number.

6. An auxiliary circuit as claimed in claim 1, wherein each subscriber station further comprises a telephone instrument and said indicating means are characterized in that they are operable without removal of the handset of said instrument from its cradle.

7. An auxiliary circuit as claimed in claim 5, further comprising an electromagnetic test relay coupled to the ultimate connection of said first impulse counter, said test relay having contacts for halting operation of said impulse generating means.

8. A circuit arrangement as claimed in claim 1, wherein said pulse counting means comprises a pair of stepping devices, a plurality of interconnections between said stepping devices characteristic of each of said pulse groups, said first stepping device adapted to respond to each pulse of each of said groups of pulses, said second stepping device adapted to respond to the numbers of groups of said pulses, and a connection extending through both said stepping devices for rendering said reconnecting means operative after counting the last pulse of the last group of impulses of a called number.

9. A circuit arrangement as claimed in claim 1, further comprising a cancelling key at each subscriber's station, said key in a circuit adapted to effect cancellation of the operation of said seizure means.

10. A circuit arrangement as claimed in claim 1, wherein said pulse counting means are common to a plurality of said subscribers' stations.

References Cited in the file of this patent

UNITED STATES PATENTS

| | | |
|---|---|---|
| 1,445,235 | Plotner | Feb. 13, 1923 |
| 1,845,215 | Ballhorn | Feb. 16, 1932 |
| 2,333,195 | Pouliart | Nov. 2, 1943 |
| 2,537,188 | Kaelin | Jan. 9, 1951 |
| 2,576,189 | Olliver | Nov. 27, 1951 |
| 2,713,617 | Dunlap | July 19, 1955 |